United States Patent
Wu et al.

(10) Patent No.: US 12,391,277 B2
(45) Date of Patent: Aug. 19, 2025

(54) AUTONOMOUS DRIVING SYSTEM

(71) Applicant: BEIJING TUSEN WEILAI TECHNOLOGY CO., LTD, Beijing (CN)

(72) Inventors: Nan Wu, Beijing (CN); He Zheng, Beijing (CN)

(73) Assignee: BEIJING TUSEN WEILAI TECHNOLOGY CO., LTD, Beijing (CN)

( * ) Notice: Subject to any disclaimer, the term of this patent is extended or adjusted under 35 U.S.C. 154(b) by 178 days.

(21) Appl. No.: 18/316,293

(22) Filed: May 12, 2023

(65) Prior Publication Data
US 2023/0278583 A1 Sep. 7, 2023

Related U.S. Application Data

(63) Continuation of application No. 16/923,520, filed on Jul. 8, 2020, now Pat. No. 11,648,958, which is a (Continued)

(30) Foreign Application Priority Data

Jan. 8, 2018 (CN) .......................... 201810015286.9

(51) Int. Cl.
*B60W 60/00* (2020.01)
*B60W 50/14* (2020.01)

(52) U.S. Cl.
CPC ........ *B60W 60/0011* (2020.02); *B60W 50/14* (2013.01); *B60W 60/0015* (2020.02); (Continued)

(58) Field of Classification Search
CPC ......... B60W 60/0011; B60W 60/0015; B60W 60/0025; B60W 60/0053; B60W 50/14; (Continued)

(56) References Cited

U.S. PATENT DOCUMENTS

2007/0293989 A1 12/2007 Norris
2010/0109430 A1 5/2010 DiSaverio et al.
(Continued)

FOREIGN PATENT DOCUMENTS

CN 101549707 A 10/2009
CN 103645715 A 3/2014
(Continued)

OTHER PUBLICATIONS

European Patent Office, Communication pursuant to Article 94(3) EPC for EP Appl. No. 18898940.4, mailed Aug. 29, 2023, 5 pages.
(Continued)

*Primary Examiner* — Michael D Lang
(74) *Attorney, Agent, or Firm* — Perkins Coie LLP

(57) ABSTRACT

An autonomous driving system includes: at least one sensor (1) configured to collect environment information around a vehicle; a primary decision unit (21) configured to calculate decision information based on the environment information collected by the at least one sensor (1), and transmit the decision information to a controller (3); an alternative decision unit (22) configured to calculate decision information based on the environment information collected by the at least one sensor (1) in response to detecting that the primary decision unit (21) is abnormal, and transmit the decision information to the controller (3); and the controller (3) configured to calculate vehicle control information based on the received decision information, and transmit the vehicle control information to a bottom vehicle controller. In this way, the stability and reliability of the autonomous driving system can be improved and safety of autonomous driving of the vehicle can be guaranteed.

19 Claims, 10 Drawing Sheets

Related U.S. Application Data continuation of application No. PCT/CN2018/105476, filed on Sep. 13, 2018.

(52) U.S. Cl.
CPC .... *B60W 60/0025* (2020.02); *B60W 60/0053* (2020.02); *B60W 2050/143* (2013.01); *B60W 2050/146* (2013.01); *B60W 2420/403* (2013.01); *B60W 2420/408* (2024.01); *B60W 2556/45* (2020.02)

(58) Field of Classification Search
CPC ....... B60W 2556/45; B60W 2420/408; B60W 2050/143; B60W 2050/146; B60W 2420/403

See application file for complete search history.

(56) References Cited

U.S. PATENT DOCUMENTS

| | | |
|---|---|---|
| 2014/0351658 A1 | 11/2014 | D'Ambrosia |
| 2015/0012166 A1 | 1/2015 | Hauler et al. |
| 2016/0031448 A1 | 2/2016 | Sakai |
| 2016/0103450 A1 | 4/2016 | Hogenmueller et al. |
| 2017/0277607 A1 | 9/2017 | Samii et al. |
| 2018/0283872 A1* | 10/2018 | Robinson ........... G01C 21/3833 |
| 2020/0331493 A1 | 10/2020 | Wu et al. |

FOREIGN PATENT DOCUMENTS

| | | |
|---|---|---|
| CN | 104049530 A | 9/2014 |
| CN | 104267721 A | 1/2015 |
| CN | 104503272 A | 4/2015 |
| CN | 105346483 A | 2/2016 |
| CN | 105785993 A | 7/2016 |
| CN | 106094830 A | 11/2016 |
| CN | 106340197 A | 1/2017 |
| CN | 106354141 A | 1/2017 |
| CN | 106774291 A | 5/2017 |
| CN | 107024927 A | 8/2017 |
| CN | 107161141 A | 9/2017 |
| CN | 107187465 A | 9/2017 |
| CN | 108196547 A | 6/2018 |
| DE | 102014213171 A1 | 10/2015 |
| JP | 2015203938 | * 11/2015 ............... G05D 1/02 |

OTHER PUBLICATIONS

Nielles, Daniel. European Application No. 18898940, Extended European Search Report Mailed Aug. 23, 2021, pp. 1-9.
No Author Chinese Application 2018100152869 First Office Action Mailed Sep. 17, 2019, pp. 1-16.
No Author Chinese Application 2018100152869 Notice of Grant, Mailed Apr. 17, 2021, pp. 1-4.
Ooka Naoto "Development of automatic driving system on rough road", Nippondenso Co, Aug. 6, 2002 (Year: 2002).
Lu Jinwen, Driving control system and driving control method, (Jan. 25, 2017), English translation of CN 106354141 A (Year: 2017).
Local Area Network, Jan. 20, 2017, Wikipedia (Year: 2017).
International Search Report and Written Opinion Mailed Nov. 27, 2018 in International Application No. PCT/CN2018/105476.

* cited by examiner

AUTONOMOUS DRIVING SYSTEM

CROSS-REFERENCE TO RELATED APPLICATIONS

This application is a continuation of U.S. patent application Ser. No. 16/923,520, filed on Jul. 8, 2020, which is a continuation of International Patent Application No. PCT/CN2018/105476, filed on Sep. 13, 2018, which claims priority to and the benefit of Chinese Patent Application No. 201810015286.9, filed Jan. 8, 2018. The entire contents of the aforementioned applications are incorporated by reference as part of the disclosure of this application in their entireties.

TECHNICAL FIELD

The present disclosure relates to autonomous driving technology, and more particularly, to an autonomous driving system.

BACKGROUND

Implementation of autonomous driving of a vehicle mainly involves parts such as sensing, decision and control. The sensing part collects environment information around the vehicle using sensors mounted on the vehicle. For example, surrounding obstacles can be sensed using e.g., cameras or laser radars. The decision part is implemented by a decision unit which provides decision information based on the environment information collected by the cameras. Finally, a controller controls the vehicle to move along a decided path based on the decision information outputted from the decision unit.

However, the current autonomous driving technology is still in an experimental or testing phase, and there are still many technical problems that need to be overcome. For example, vehicles, especially trucks, may cause damages to hardware in the decision unit and the controller in the autonomous driving system due to bumping and shaking while the vehicle is moving, resulting in a problem that the autonomous driving system fails to work. As another example, in order to ensure that the vehicle can move safely, the autonomous driving system needs to have the ability to process a large amount of data quickly and in real time. During the calculation process, the autonomous driving system may crash due to problems such as poor heat dissipation. Therefore, how to ensure the stable and reliable operation of the autonomous driving system has become a technical problem to be solved by those skilled in the art.

SUMMARY

In view of the above problem, the present disclosure provides an autonomous driving system, capable of improving the stability and reliability of the autonomous driving system and guaranteeing safety of autonomous driving of a vehicle.

According to an embodiment of the present disclosure, an autonomous driving system is provided. The autonomous driving system includes at least one sensor, a decision unit and a controller. The decision unit includes a primary decision unit and an alternative decision unit. The at least one sensor is configured to collect environment information around a vehicle. The primary decision unit is configured to calculate decision information based on the environment information collected by the at least one sensor, and transmit the decision information to the controller. The alternative decision unit is configured to calculate decision information based on the environment information collected by the at least one sensor in response to detecting that the primary decision unit is abnormal, and transmit the decision information to the controller. The controller is configured to calculate vehicle control information based on the received decision information, and transmit the vehicle control information to a bottom vehicle controller.

The autonomous driving system according to the embodiment of the present disclosure is provided with two decision units, a primary decision unit and an alternative decision unit. The alternative decision unit monitors the state of the primary decision unit, and upon detecting that the primary decision unit is abnormal, takes over and calculates decision information based on the environment information, so as to guarantee normal operation of the autonomous driving system, such that the entire autonomous driving system will not crash due to failure of the primary decision unit. In this way, the stability and reliability of the autonomous driving system can be improved.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The autonomous driving system according to the embodiment of the present disclosure can be applied to autonomous vehicles (such as cars, trucks, public transportation vehicles, buses, sweepers, sprinklers, electric vehicles, etc.), drones, unmanned ships, etc. The present disclosure is not limited to any specific application scenario.

Embodiment 1

Figure 1:
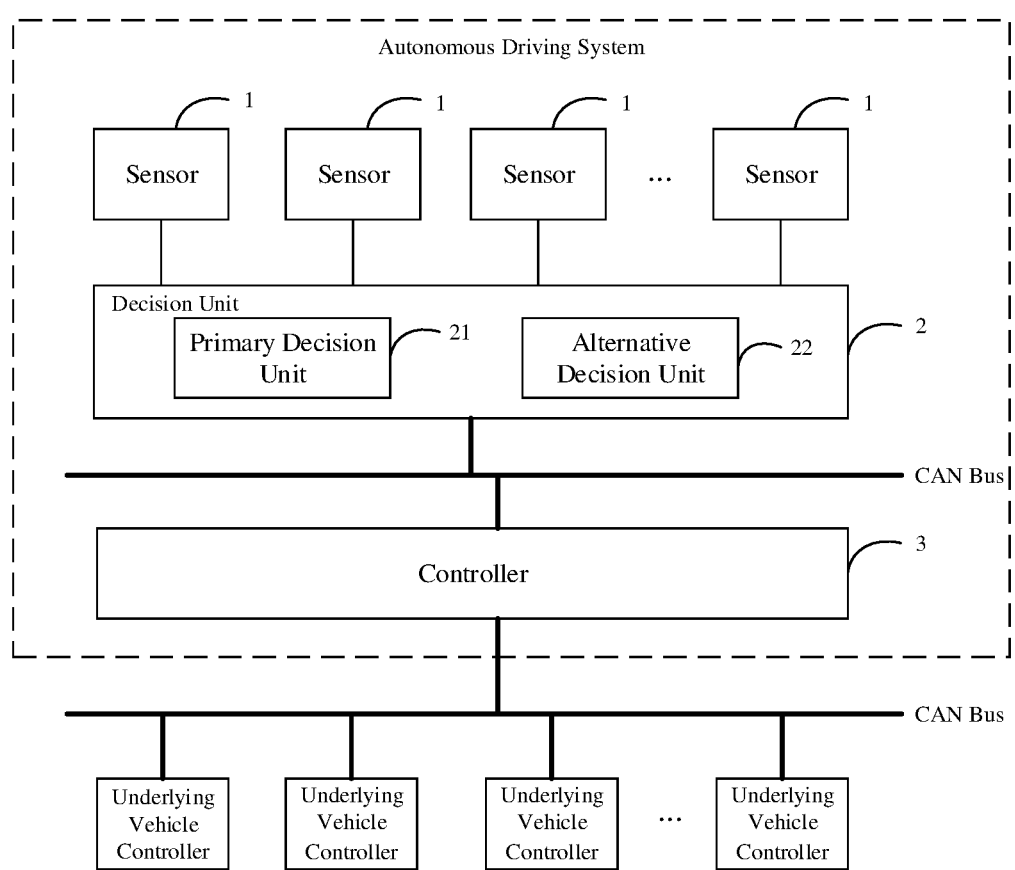
FIG. 1 is a first schematic diagram showing a structure of an autonomous driving system according to an embodiment of the present disclosure.

FIG. 1 is a schematic diagram of an autonomous driving system according to Embodiment 1 of the present disclosure. Referring to FIG. 1, the autonomous driving system includes at least one sensor 1, a decision unit 2, and a controller 3. The controller 3 is connected to a bottom vehicle controller, which may include a Vehicle Control Unit (VCU), a brake Electronic Control Unit (ECU), a throttle ECU, a steering wheel ECU, etc. The decision unit 2 includes a primary decision unit 21 and an alternative decision unit 22.

The at least one sensor 1 is configured to collect environment information around a vehicle.

In an embodiment of the present disclosure, the at least one sensor 1 may include any one or more types of sensors: a camera, a laser radar, a millimeter wave radar, a positioning sensor, a wind speed sensor, a light sensor, an infrared sensor, etc. Here, the positioning sensor may be a Global Positioning System (GPS), a Global Navigation Satellite System (GNSS) or an Inertial Navigation System (INS). The camera may include a front camera, a side camera, and a rear camera of the vehicle. The environment information collected by the camera may be image data within the field of view of the camera. The environment information collected by the laser radar may be laser point cloud data. The environment information collected by the positioning sensor may be location information of the vehicle. The environment information collected by the wind speed sensor may be information such as a wind speed and a wind direction. The environment information collected by the light sensor may be light intensity.

The primary decision unit 21 is configured to calculate decision information based on the environment information collected by the at least one sensor, and transmit the decision information to the controller.

In an embodiment of the present disclosure, the primary decision unit 21 determines the perception information (which may include obstacles around the vehicle, distances and directions between the vehicle and the respective obstacles, lane line information, traffic information, etc.) based on the environment information, and then calculate the decision information based on the perception information. Here, the decision information may include a moving path of the vehicle, which includes information on waypoints constituting the path, and each waypoint includes latitude and longitude coordinate information.

The alternative decision unit 22 is configured to calculate decision information based on the environment information collected by the at least one sensor 1 in response to detecting that the primary decision unit 21 is abnormal, and transmit the decision information to the controller 3.

The controller 3 is configured to calculate vehicle control information based on the received decision information, and transmit the vehicle control information to the bottom vehicle controller.

In an embodiment of the present disclosure, the vehicle control information calculated by the controller 3 may include any one or more of the following parameters: a steering angle of a steering wheel, a torque, throttle information, brake information, lighting control information, horn control information, etc.

In an embodiment of the present disclosure, the decision unit 2, the controller 3 and the bottom vehicle controller can communicate with each other via a vehicle mounted Controller Area Network (CAN). The decision unit 2, the controller 3 and the bottom vehicle controller are connected to a CAN bus, and the decision unit 2 and the controller 3 can transmit information via the CAN bus. For example, the decision unit 2 can transmit the decision information onto the CAN bus, and the controller 3 can receive the decision information from the CAN bus. The controller 3 can transmit the vehicle control information onto the CAN bus, and the bottom vehicle controller can receive the vehicle control information from the CAN bus.

The autonomous driving system according to Embodiment 1 of the present disclosure is provided with two decision units, a primary decision unit and an alternative decision unit. The alternative decision unit monitors the state of the primary decision unit, and upon detecting that the primary decision unit is abnormal, takes over and calculates decision information based on the environment information, so as to guarantee normal operation of the autonomous driving system, such that the entire autonomous driving system will not crash due to failure of the primary decision unit. In this way, the stability and reliability of the autonomous driving system can be improved, and safe driving of the vehicle can be guaranteed.

Embodiment 2

Figure 2:
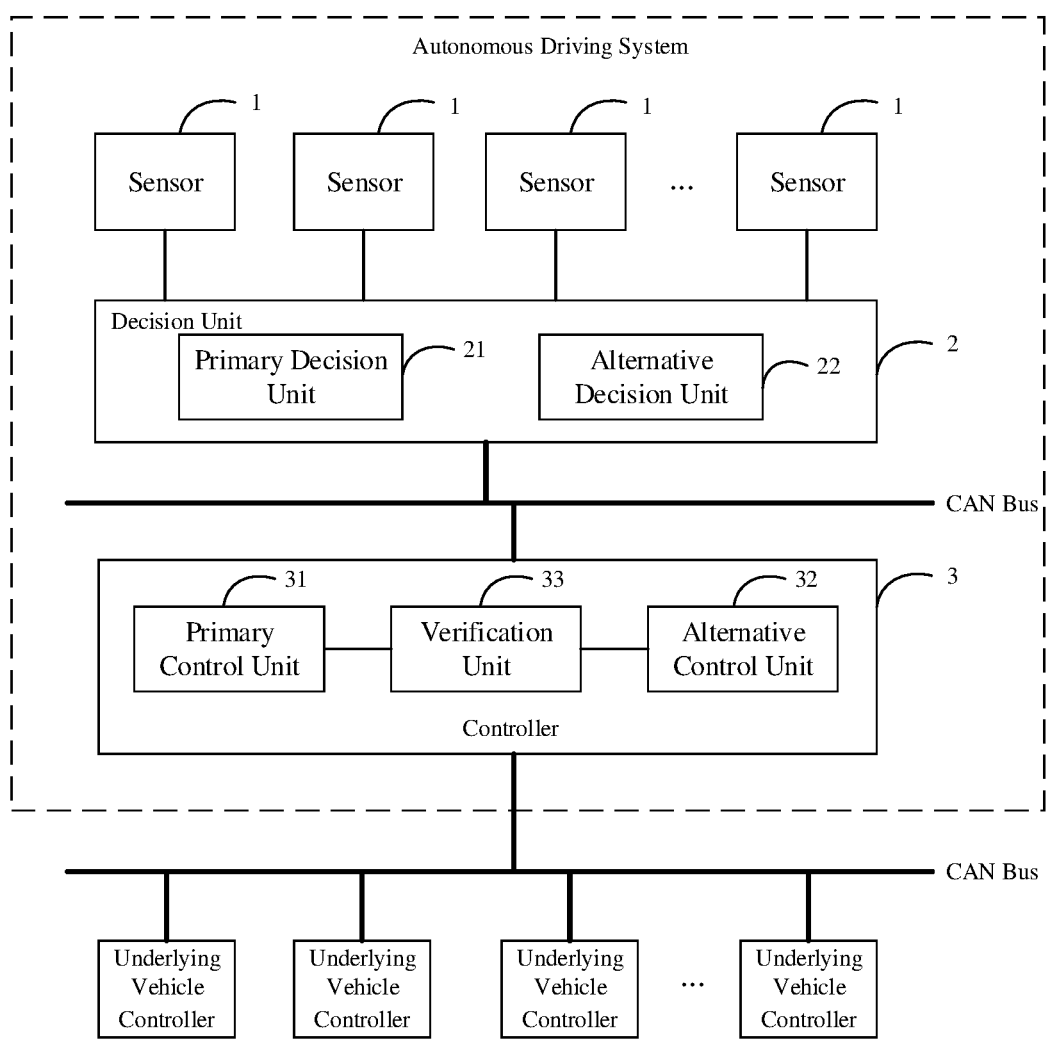
FIG. 2 is a second schematic diagram showing a structure of an autonomous driving system according to an embodiment of the present disclosure.

FIG. 2 is a schematic diagram of an autonomous driving system according to Embodiment 2 of the present disclosure. Referring to FIG. 2, the autonomous driving system includes at least one sensor 1, a decision unit 2 and a controller 3. The decision unit 2 includes a primary decision unit 21 and an alternative decision unit 22. The controller 3 includes a primary control unit 31, an alternative control unit 32, and a verification unit 33. For details of the at least one sensor 1, the primary decision unit 21 and the alternative decision unit 22, reference can be made to Embodiment 1 as described above, and description thereof will be omitted here. The modules included in the controller 3 will be described in detail below.

The primary control unit 31 is configured to calculate first vehicle control information based on the received decision information, and transmit the first vehicle control information to the verification unit 33.

The alternative control unit 32 is configured to calculate second vehicle control information based on the received decision information, and transmit the second vehicle control information to the verification unit 33.

The verification unit 33 is configured to select one of the first vehicle control information and the second vehicle control information as the vehicle control information, and transmit the selected vehicle control information to the bottom vehicle controller.

In an embodiment of the present disclosure, each of the primary decision unit 21 and the alternative decision unit 22 transmits its determined decision information onto the CAN bus, and each of the primary control unit 31 and the alternative control unit 32 receives the decision information from the CAN bus.

In an embodiment of the present disclosure, the primary control unit 31 and the alternative control unit 32 may be two hardware devices having the same structures and parameter settings. They calculate the vehicle control information based on the received decision information in the same way. Based on the information on the waypoints in the decision information, the primary control unit 31 and the alternative control unit can determine the vehicle control information for controlling the vehicle to move from a current position to a next waypoint position, including e.g., a steering angle of a steering wheel, a torque, acceleration information, and lighting control information, horn control information, etc.

In an embodiment of the present disclosure, the verification unit 33 selecting one of the first vehicle control information and the second vehicle control information as the vehicle control information may include: determining whether each of the first vehicle control information and the second vehicle control information is abnormal in accordance with a predetermined determination mechanism; when the first vehicle control information and the second vehicle control information are both normal, selecting the first vehicle control information as vehicle control information; when the first vehicle control information and the second vehicle control information are both are abnormal, triggering an alarm; or when one of the first vehicle control information and the second vehicle control information is abnormal, selecting the other as the vehicle control information.

In an embodiment of the present disclosure, the verification unit 33 may be provided in advance with criteria for determining whether various parameters in the vehicle control information are abnormal or not. For example, if a value of the steering angle of the steering wheel is within a predetermined value range, the steering angle parameter is considered to be normal; otherwise it is considered to be abnormal. As another example, if the lighting control information indicates that a left turn signal or a right turn signal is on while the vehicle is in a through lane, it is confirmed that the lighting control information is abnormal. If the lighting control information indicates that a right turn signal is on while the vehicle is in a left turn lane, it is confirmed that the lighting control information is abnormal. If the lighting control information indicates that a left turn signal is on while the vehicle is in a right turn lane, it is confirmed that the lighting control information is abnormal. As yet another example, when the acceleration is greater than 0 while the distance between the vehicle and the vehicle ahead is smaller than or equal to a safe distance, it means that the acceleration information is abnormal. These can be set flexibly by those skilled in the art depending on actual requirements, and the present disclosure is not limited to any of these examples.

The verification unit 33 determining whether each of the first vehicle control information and the second vehicle control information is abnormal in accordance with the predetermined determination mechanism may include: determining whether there is an abnormal parameter in the first vehicle control information (or the second vehicle control information); and if so, determining that the first vehicle control information (or the second vehicle control information) is abnormal, or otherwise determining that the first vehicle control information (or the second vehicle control information) is normal.

In an embodiment of the present disclosure, if the first vehicle control information and the second vehicle control information are both abnormal, meaning that the primary control unit 31 and the alternative control unit 32 are both abnormal, and it is determined that the autonomous driving system cannot operate normally. Thus, the verification unit 33 can trigger an alarm, including, but not limited to, any one or more of: displaying fault information in a pop-up alarm window on an interactive interface of the autonomous driving system, playing voice alarm information, or transmitting alarm information to a remote server.

With the autonomous driving system according to Embodiment 2 of the present disclosure, on one hand, a redundancy design is provided for the decision unit 2 to improve the stability and reliability of the decision unit 2; and on the other hand, a redundancy design is provided for the controller 3 to improve the stability and reliability of the controller 3. Therefore, when compared with Embodiment 1, the stability and reliability of the autonomous driving system can be further improved.

Embodiment 3

Figure 3:
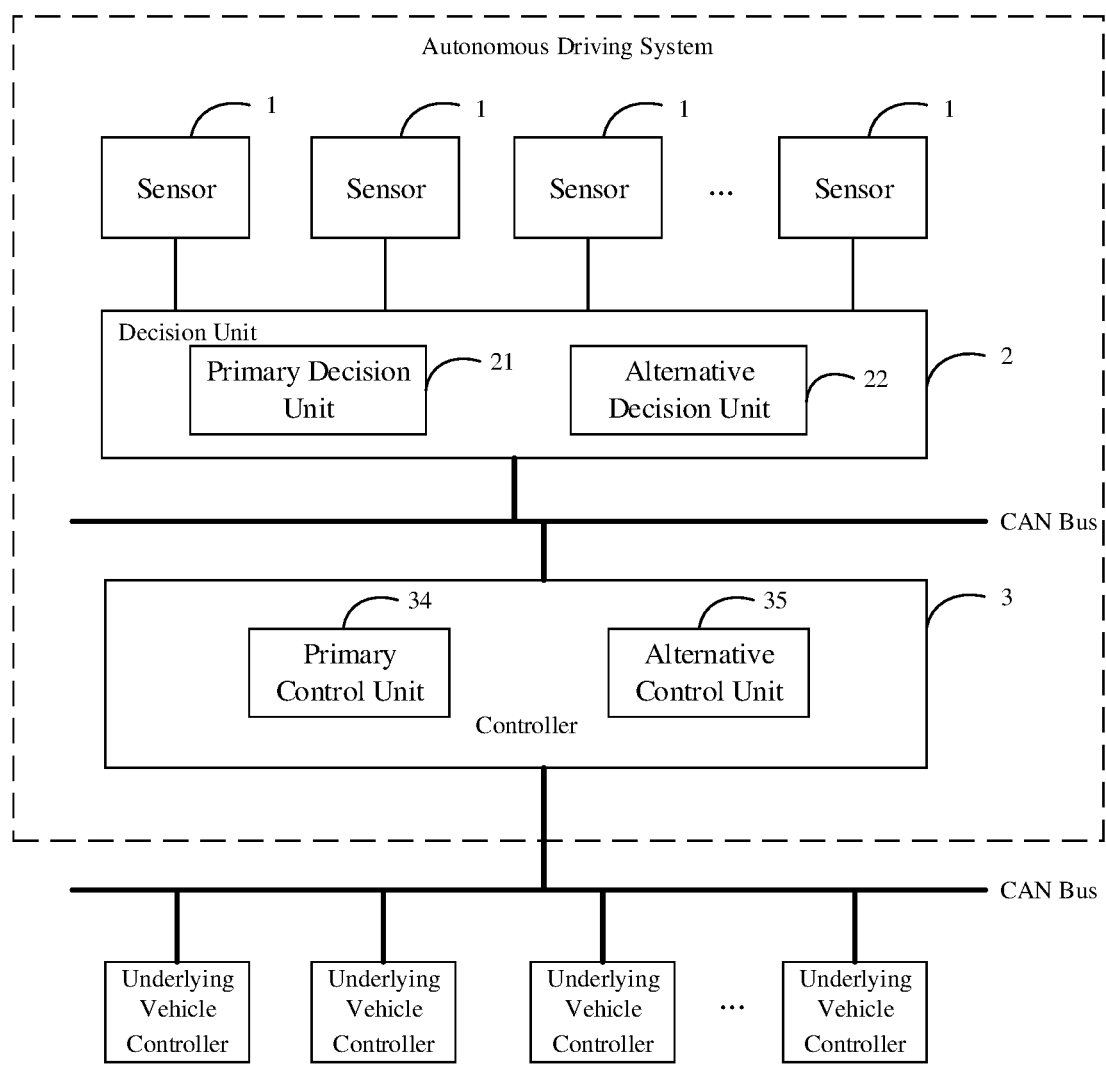
FIG. 3 is a third schematic diagram showing a structure of an autonomous driving system according to an embodiment of the present disclosure.

FIG. 3 is a schematic diagram of an autonomous driving system according to Embodiment 3 of the present disclosure. Referring to FIG. 3, the autonomous driving system includes at least one sensor 1, a decision unit 2, and a controller 3. The decision unit 2 includes a primary decision unit 21 and an alternative decision unit 22. The controller 3 includes a primary control unit 34 and an alternative control unit 35. For details of the at least one sensor 1, the primary decision unit 21 and the alternative decision unit 22, reference can be made to Embodiment 1 as described above, and description thereof will be omitted here. The modules included in the controller 3 will be described in detail below.

The primary control unit 34 is configured to calculate first vehicle control information based on the received decision information, and transmit the first vehicle control information to the bottom vehicle controller.

The alternative control unit 35 is configured to calculate second vehicle control information based on the received decision information in response to detecting that the primary control unit 34 is abnormal, and transmit the second vehicle control information to the bottom vehicle controller.

In an example, the primary control unit 34 can be further configured to: transmit first verification information for verifying whether the primary control unit 34 is abnormal to the alternative control unit 35 periodically. The alternative control unit 35 can be further configured to determine whether the primary control unit 34 is abnormal based on the first verification information.

Figure 4:
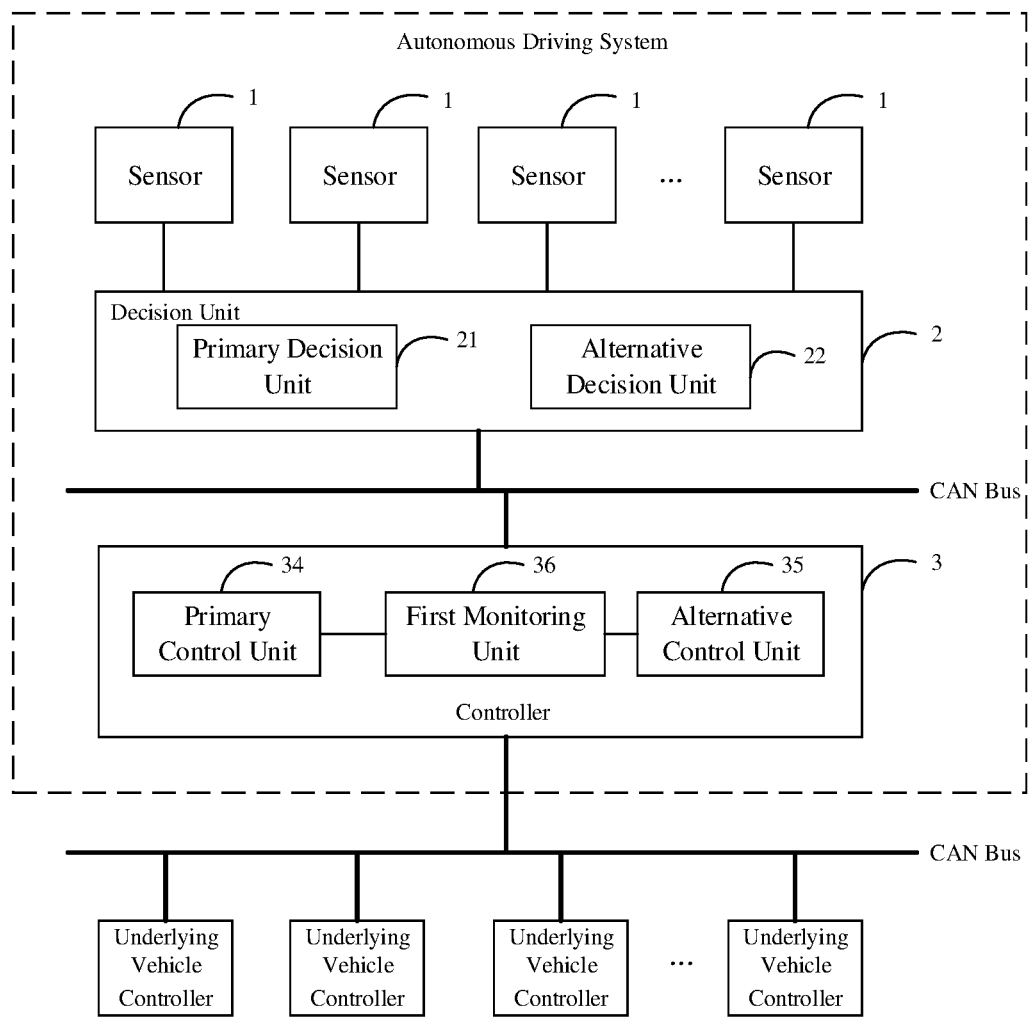
FIG. 4 is a fourth schematic diagram showing a structure of an autonomous driving system according to an embodiment of the present disclosure.
Figure 5:
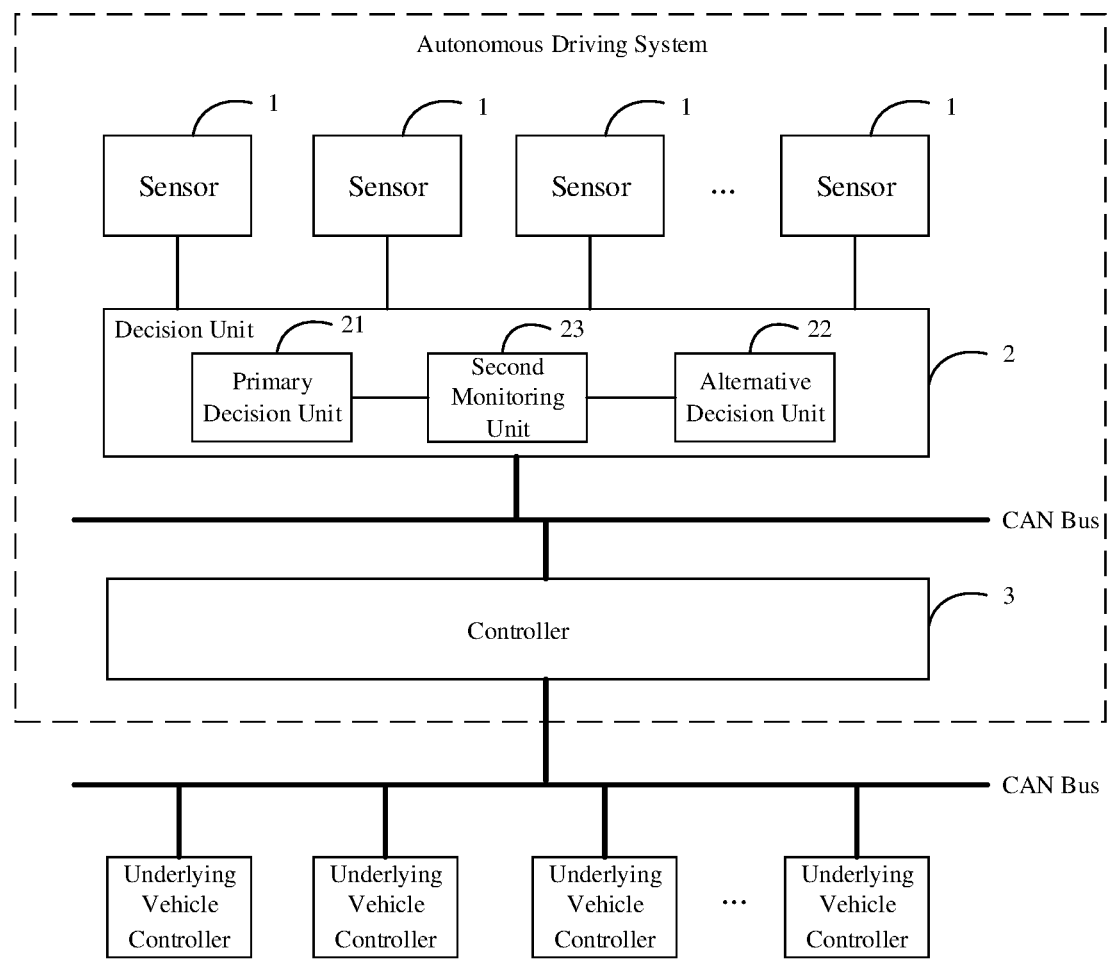
FIG. 5 is a fifth schematic diagram showing a structure of an autonomous driving system according to an embodiment of the present disclosure.
Figure 6:
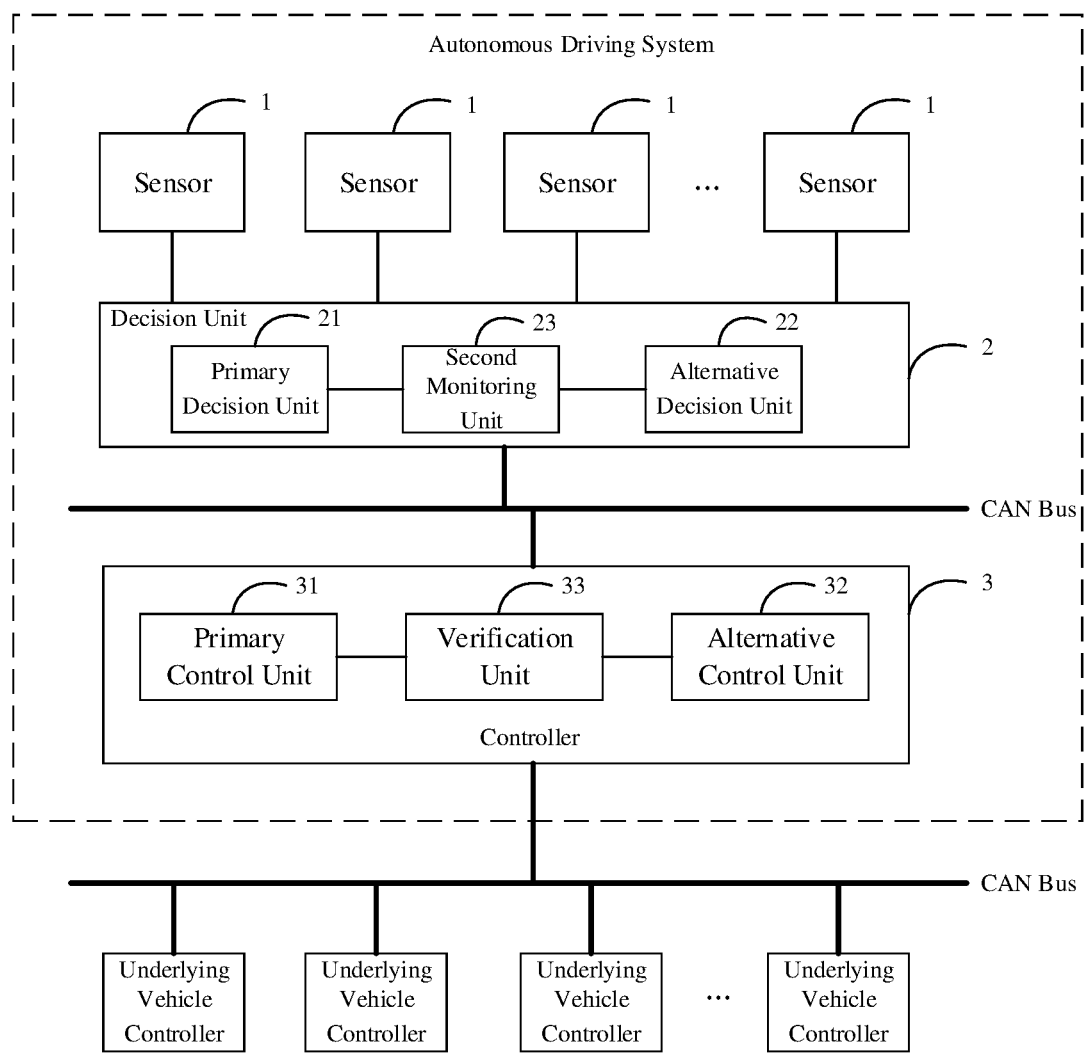
FIG. 6 is a sixth schematic diagram showing a structure of an autonomous driving system according to an embodiment of the present disclosure.
Figure 7:
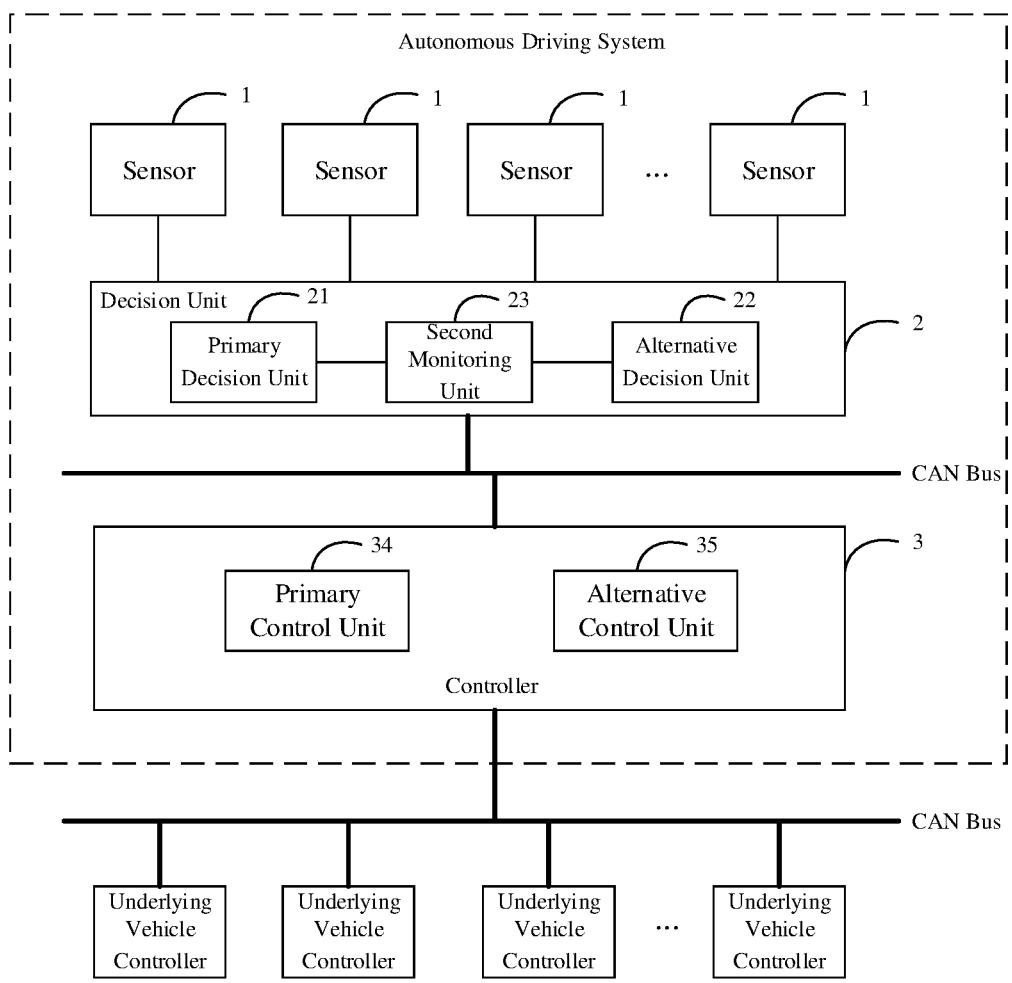
FIG. 7 is a seventh schematic diagram showing a structure of an autonomous driving system according to an embodiment of the present disclosure.
Figure 8:
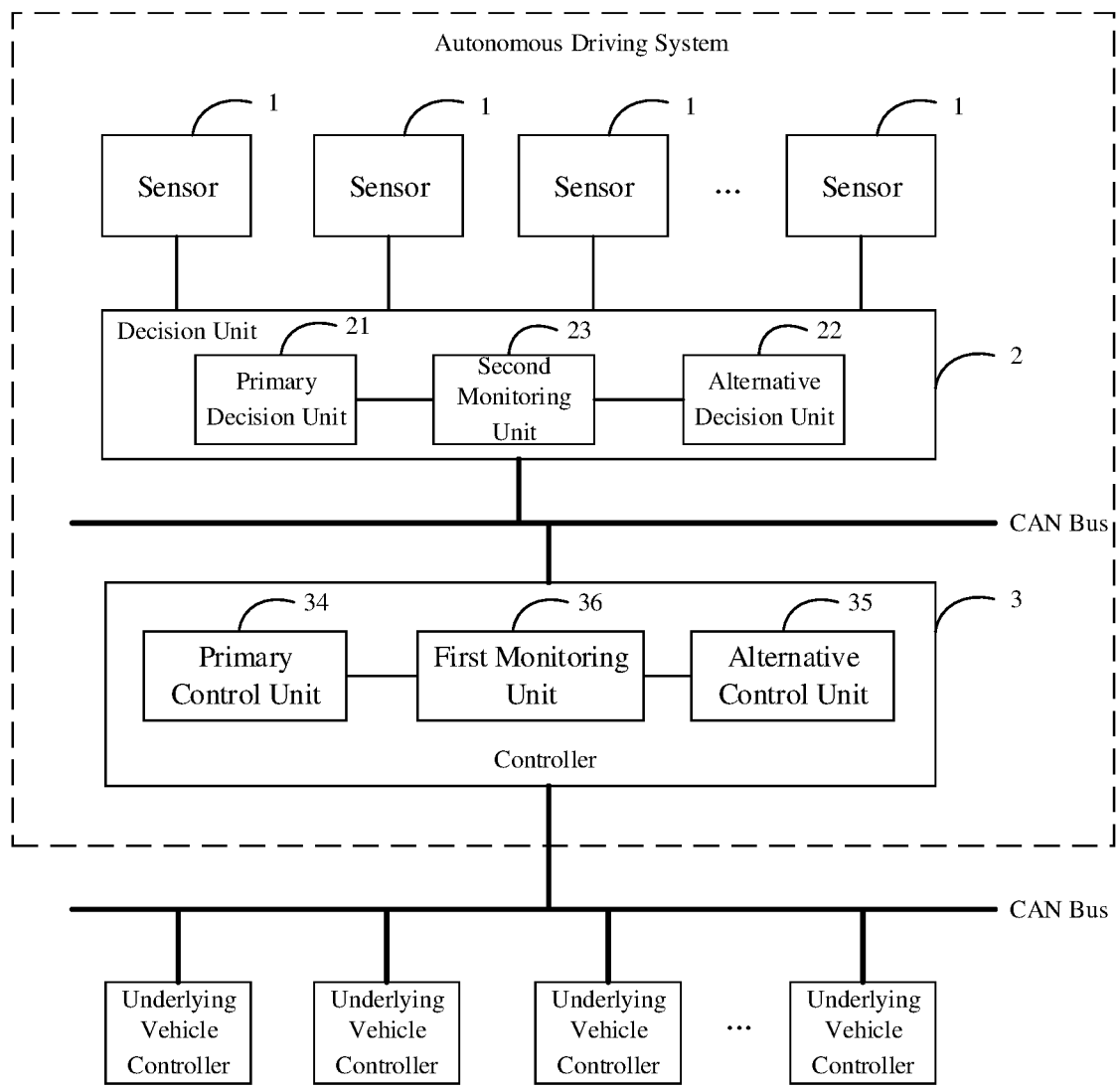
FIG. 8 is an eighth schematic diagram showing a structure of an autonomous driving system according to an embodiment of the present disclosure.

In another example, the controller can further include a first monitoring unit 36. As shown in FIG. 4, the primary control unit 34 can be further configured to transmit first verification information for verifying whether the primary control unit 34 is abnormal to the first monitoring unit 36 periodically. The first monitoring unit 36 can be configured to determine whether the primary control unit 34 is abnormal based on the first verification information, and transmit a determination result to the alternative control unit 35.

In an example, the first verification information may be a verification code, and a verification mechanism may be set in the primary control unit 34 and the alternative control unit 35 (or the first monitoring unit 36) in advance. The primary control unit 34 can periodically generate verification codes in accordance with the predetermined verification mechanism, and transmit the verification codes to the alternative control unit 35 (or the first monitoring unit 36). The alternative control unit 35 (or the first monitoring unit 36) can verify each received verification code in accordance with the predetermined verification mechanism, and determine that the primary control unit 34 is normal when the verification succeeds, or determine that the primary control unit 34 is abnormal when the verification fails. For example, assuming that the value range of the verification code is 0-255, the primary control unit 34 can determine whether the value of the previous verification code is 255 or not each time before generating the current verification code, and if not, generate the current verification code by incrementing the previous verification code by 1, or otherwise use 0 as the current verification code (these operations may be performed cyclically). Correspondingly, each time the alternative control unit 35 (or the first monitoring unit 36) receives the verification code, it can determine whether the previously received verification code is 255 or not. If the previously received verification code is 255, it can then determine whether the currently received verification code is 0 or not, and if so, the verification succeeds, or otherwise the verification fails. If the previously received verification code is not 255, it can then determine whether the currently received verification code is larger than the previous verification code by 1 or not, and if so, the verification succeeds, or otherwise the verification fails.

In another example, the first verification information may alternatively be a heartbeat message. The primary control unit 34 can periodically transmit heartbeat messages to the alternative control unit 35 (or the first monitoring unit 36). The alternative control unit 35 (or the first monitoring unit 36) can start a timer each time after receiving a heartbeat message, determine whether the next heartbeat message from the primary control unit 34 is received when the timer reaches a predetermined time length threshold (which is greater than or equal to the time period at which the primary control unit 34 transmits heartbeat messages), and if so, determine that the primary control unit 34 is normal, or otherwise determine that the primary control unit 34 is abnormal.

In some embodiments, in the autonomous driving system described above in connection with FIGS. 1-4, the primary decision unit 21 may be further configured to transmit second verification information for verifying whether the primary decision unit 21 is normal to the alternative decision unit 22 periodically. The alternative decision unit 22 may be further configured to determine whether the primary decision unit 21 is abnormal based on the second verification information.

In other embodiments, in the autonomous driving system described above in connection with FIGS. 1-4, the decision unit 2 may further include a second monitoring unit 23. FIGS. 5-8 show that the decision unit 2 of the autonomous driving system shown in each of FIGS. 1-4 can further include a second monitoring unit 23, respectively.

The primary decision unit 21 can be further configured to transmit second verification information for verifying whether the primary decision unit 21 is normal to the second monitoring unit 23 periodically. The second monitoring unit 23 can be configured to determine whether the primary decision unit 21 is abnormal based on the second verification information, and transmit a determination result to the alternative decision unit 22.

In an example, the second verification information may be a verification code, and a verification mechanism may be set in the primary decision unit 21 and the alternative decision unit 22 (or the second monitoring unit 23) in advance. The primary decision unit 21 can periodically generate verification codes in accordance with the predetermined verification mechanism, and transmit the verification codes to the alternative decision unit 22 (or the second monitoring unit 23). The alternative decision unit 22 (or the second monitoring unit 23) can verify each received verification code in accordance with the predetermined verification mechanism, and determine that the primary decision unit 21 is normal when the verification succeeds, or determine that the primary decision unit 21 is abnormal when the verification fails. For example, assuming that the value range of the verification code is 0-255, the primary decision unit 21 can determine whether the value of the previous verification code is 255 or not each time before generating the current verification code, and if not, generate the current verification code by incrementing the previous verification code by 1, or otherwise use 0 as the current verification code (these operations may be performed cyclically). Correspondingly, each time the alternative decision unit 22 (or the second monitoring unit 23) receives the verification code, it can determine whether the previously received verification code is 255 or not. If the previously received verification code is 255, it can then determine whether the currently received verification code is 0 or not, and if so, the verification succeeds, or otherwise the verification fails. If the previously received verification code is not 255, it can then determine whether the currently received verification code is larger than the previous verification code by 1 or not, and if so, the verification succeeds, or otherwise the verification fails.

In another example, the second verification information may alternatively be a heartbeat message. The primary decision unit 21 can periodically transmit heartbeat messages to the alternative decision unit 22 (or the second monitoring unit 23). The alternative decision unit 22 (or the second monitoring unit 23) can start a timer each time after receiving a heartbeat message, determine whether the next heartbeat message from the primary decision unit 21 is received when the timer reaches a predetermined time length threshold (which is greater than or equal to the time period at which the primary decision unit 21 transmits heartbeat messages), and if so, determine that the primary decision unit 21 is normal, or otherwise determine that the primary decision unit 21 is abnormal.

With the autonomous driving system according to Embodiment 3 of the present disclosure, on one hand, a redundancy design is provided for the decision unit 2 to improve the stability and reliability of the decision unit 2; and on the other hand, a redundancy design is provided for the controller 3 to improve the stability and reliability of the controller 3. Therefore, when compared with Embodiment 1, the stability and reliability of the autonomous driving system can be further improved.

Figure 9:
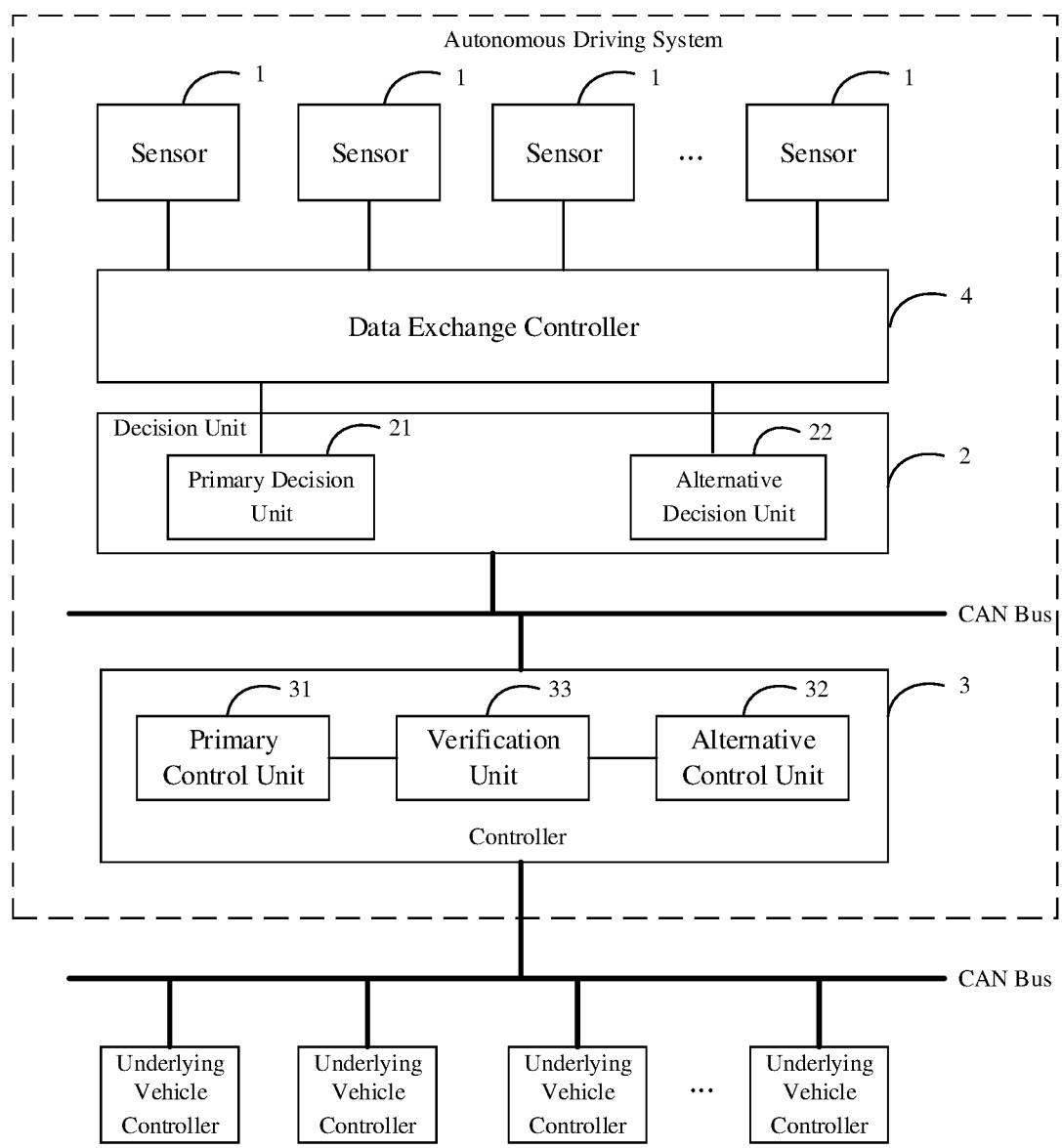
FIG. 9 is a ninth schematic diagram showing a structure of an autonomous driving system according to an embodiment of the present disclosure.

In practice, data outputted from each sensor is typically data in one channel. In order to further ensure that each of the primary decision unit 21 and the alternative decision unit 22 can obtain the environment information collected by each sensor timely, thereby facilitating the multiplexing of the sensor data, in an embodiment of the present disclosure, the autonomous driving system shown in FIGS. 1-8 may further include a data exchange controller 4. FIG. 9 shows that the autonomous driving system shown in FIG. 2 can further include a data exchange controller 4.

The data exchange controller 4 is configured to receive the environment information collected by the at least one sensor 1 and transmit the environment information to each of the primary decision unit 21 and the alternative decision unit 22.

Figure 10:
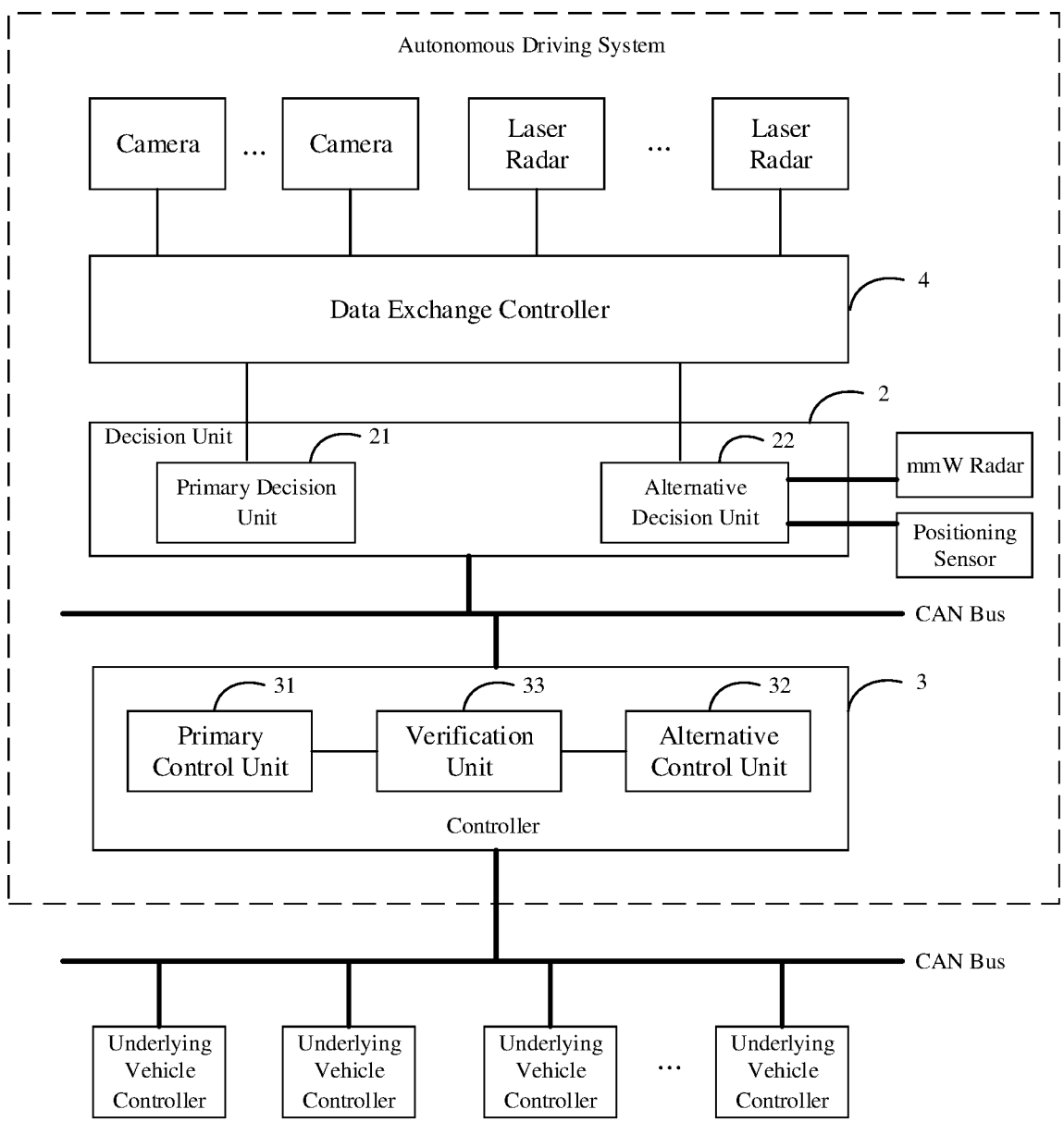
FIG. 10 is a tenth schematic diagram showing a structure of an autonomous driving system according to an embodiment of the present disclosure.

In an embodiment of the present disclosure, in order to further improve the data transmission efficiency, a sensor having a large amount of data to transmit, e.g., a camera, a laser radar, etc., can transmit the collected environment information to the data exchange controller 4 via a Local Area Network (LAN). A sensor having a small amount of data to transmit, e.g., a millimeter wave radar, a positioning sensor, etc., can transmit the collected environment information to the alternative decision unit 22 via a vehicle-mounted CAN, and then the alternative decision unit 22 can transmit the environment information to the primary decision unit 21. For example, the alternative decision unit 22 can transmit the environment information received from the millimeter wave radar and the positioning sensor to a CAN bus, and the primary decision unit 21 can receive the environment information from the CAN bus. As shown in FIG. 10, a sensor having a large amount of data, e.g., a camera or a laser radar, can communicate the data with the data exchange controller 4 via the LAN, and the data exchange controller 4 can communicate the data with the primary decision unit 21 and the alternative decision unit 22 via the LAN. A sensor having a small amount of data, e.g., a millimeter wave radar or a positioning sensor, can communicate the data via the CAN, and the primary decision unit 21, the alternative decision unit 22, the controller 3, and the bottom vehicle controller can all be connected to the CAN bus.

In an embodiment of the present disclosure, the primary decision unit 21 and the alternative decision unit 22 can be provided as same devices if their costs are not an issue, i.e., the primary decision unit 21 and the alternative decision unit 22 can each have a decision function of Level-4 (L4) autonomous driving.

However, in practice, in order to have the decision function of L4 autonomous driving, a decision unit must have characteristics such as high computing performance, large data throughputs, and complicated calculation logics. The decision unit having such characteristics has a high cost. If both the primary decision unit 21 and the alternative decision unit 22 are configured to have the decision function of L4 autonomous driving, the cost may be too high for commercialization. Therefore, in an embodiment of the present disclosure, the primary decision unit 21 may be provided as a unit having a decision function of L4 level autonomous driving, and the alternative decision unit 22 may be provided as a unit having a decision function of Level-2 (L2) autonomous driving. For example, the alternative decision unit 22 may have decision capabilities such as lane keeping and following a vehicle ahead, i.e., the alternative decision unit 22 has the capability to guarantee safe driving of the vehicle when the primary decision unit 21 fails. Therefore, in an embodiment of the present disclosure, the alternative decision unit 22 calculating the second decision information based on the environment information collected by the at least one sensor may include: generating decision information for lane keeping based on the environment information; generating decision information for following a vehicle ahead based on the environment information; generating decision information for moving from a current location to an emergency lane and stopping in the emergency lane based on the environment information; or generating decision information for stopping in a current lane based on the environment information.

In the embodiment of the present disclosure, in order to further guarantee the safe driving of the vehicle, the above alternative decision unit 22 may be further configured to: transmit alarm or request for help information to a remote server, to wait for rescue; display warning information indicating a vehicle fault on a display screen on a top or back of the vehicle, to warn other vehicles or pedestrians about the statues of the vehicle status; and/or generate request information requesting for intervention of a driver, e.g., triggering an audible alarm to warn the driver to switch from an autonomous driving mode to a manual driving mode so as to take over the vehicle.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method of operating a vehicle, comprising:
    receiving information related to a plurality of waypoints of a path on which the vehicle is to operate;
    calculating first vehicle control information based on the information related to the plurality of waypoints, wherein the first vehicle control information includes one or more parameters to control a driving operation of the vehicle;
    calculating second vehicle control information in response to detecting an abnormal condition, wherein the second vehicle control information is calculated based on the plurality of waypoints, and wherein the second vehicle control information includes the one or more parameters to control the driving operation of the vehicle; and
    transmitting the second vehicle control information to cause the vehicle to perform the driving operation,
    wherein the one or more parameters includes lighting control information of the vehicle or horn control information of the vehicle.

2. The method of claim 1,
    wherein the abnormal condition is associated with an entity that calculated the first vehicle control information, and
    wherein the method further comprises:
        transmitting a plurality of verification information to verify whether the entity is abnormal, wherein the abnormal condition is detected based on the plurality of verification information.

3. The method of claim 2, wherein the plurality of verification information is transmitted periodically.

4. The method of claim 2, wherein each of the plurality of verification information includes a verification code that is generated in accordance with a predetermined technique, wherein a verification process is performed where each verification code in each verification information is verified in accordance with the predetermined technique.

5. The method of claim 4, wherein the abnormal condition is detected upon determining that the verification process has failed.

6. The method of claim 5, wherein the verification process is determined to fail based on comparing two consecutive verification codes.

7. The method of claim 4, wherein the abnormal condition is detected upon determining that values of two consecutive verification codes are not expected values.

8. The method of claim 1,
    wherein the abnormal condition is associated with the one or more parameters, and
    wherein the abnormal condition is detected in response to determining that a turn signal is on while the vehicle is in a through lane or in response to determining that a turn signal associated with a first direction is on while the vehicle is lane to turn in a second direction opposite to the first direction.

9. The method of claim 1,
    wherein the abnormal condition is associated with the one or more parameters, and
    wherein the abnormal condition is detected in response to determining that a value for acceleration is greater than zero when a distance between the vehicle and another vehicle in front of the vehicle is less than a safe distance.

10. A device in a vehicle, comprising:
    a processor configured to:
        receive information related to a plurality of waypoints of a path on which the vehicle is to operate;
        calculate first vehicle control information based on the information related to the plurality of waypoints, wherein the first vehicle control information includes one or more parameters to control a driving operation of the vehicle;
        calculate second vehicle control information in response to a detection of an abnormal condition, wherein the second vehicle control information is calculated based on the plurality of waypoints, and wherein the second vehicle control information includes the one or more parameters to control the driving operation of the vehicle; and
        transmit the second vehicle control information to cause the vehicle to perform the driving operation,
    wherein the one or more parameters includes lighting control information of the vehicle or horn control information of the vehicle.

11. The device of claim 10, wherein each of the plurality of waypoints include latitude coordinate information and longitude coordinate information.

12. The device of claim 10, wherein the one or more parameters further includes a steering angle of a steering wheel of the vehicle, a torque of the vehicle, throttle information for the vehicle, or brake information for the vehicle.

13. The device of claim 10, wherein the first vehicle control information and the second vehicle control information include information that causes the vehicle to move from a current position to a next waypoint position.

14. The device of claim 10,
wherein the abnormal condition is associated with the one or more parameters, and
wherein the abnormal condition is detected in response to determining that a turn signal is on while the vehicle is in a through lane or in response to determining that a turn signal associated with a first direction is on while the vehicle is lane to turn in a second direction opposite to the first direction.

15. The device of claim 10,
wherein the abnormal condition is associated with the one or more parameters, and
wherein the abnormal condition is detected in response to determining that a value for acceleration is greater than zero when a distance between the vehicle and another vehicle in front of the vehicle is less than a safe distance.

16. A computer program product comprising a non-transitory computer-readable media that includes code stored thereupon, the code, when executed by a processor, causing the processor to implement a method, comprising:
receiving information related to a plurality of waypoints of a path on which a vehicle is to operate;
calculating first vehicle control information based on the information related to the plurality of waypoints, wherein the first vehicle control information includes one or more parameters to control a driving operation of the vehicle;
calculating second vehicle control information in response to detecting an abnormal condition, wherein the second vehicle control information is calculated based on the plurality of waypoints, and wherein the second vehicle control information includes the one or more parameters to control the driving operation of the vehicle; and
transmitting the second vehicle control information to cause the vehicle to perform the driving operation,
wherein the abnormal condition is associated with the one or more parameters, and
wherein the abnormal condition is detected in response to determining that a turn signal is on while the vehicle is in a through lane or in response to determining that a turn signal associated with a first direction is on while the vehicle is lane to turn in a second direction opposite to the first direction.

17. The computer program product of claim 16, wherein the method further comprises:
displaying a fault information on a display in the vehicle in response to detecting the abnormal condition for both the first vehicle control information and the second vehicle control information.

18. The computer program product of claim 16, wherein the method further comprises:
transmitting an alarm information to a remote server in response to detecting the abnormal condition for both the first vehicle control information and the second vehicle control information.

19. The computer program product of claim 16, wherein the one or more parameters includes lighting control information of the vehicle or horn control information of the vehicle.

* * * * *